US007211923B2

(12) United States Patent
Potter

(10) Patent No.: US 7,211,923 B2
(45) Date of Patent: May 1, 2007

(54) ROTATIONAL MOTION BASED, ELECTROSTATIC POWER SOURCE AND METHODS THEREOF

(75) Inventor: Michael D. Potter, Churchville, NY (US)

(73) Assignee: Nth Tech Corporation, Churchville, NY (US)

( * ) Notice: Subject to any disclaimer, the term of this patent is extended or adjusted under 35 U.S.C. 154(b) by 0 days.

(21) Appl. No.: 10/705,656

(22) Filed: Nov. 10, 2003

(65) Prior Publication Data

US 2004/0155555 A1 Aug. 12, 2004

Related U.S. Application Data

(63) Continuation-in-part of application No. 10/280,304, filed on Oct. 24, 2002, now Pat. No. 6,750,590.

(60) Provisional application No. 60/338,163, filed on Oct. 26, 2001.

(51) Int. Cl.
*H02N 1/00* (2006.01)

(52) U.S. Cl. ....................................... 310/309; 322/2 A

(58) Field of Classification Search ................ 310/309; 322/2 A, 2 R; 290/1 A, 54; 361/289, 290; 381/191

See application file for complete search history.

(56) References Cited

U.S. PATENT DOCUMENTS 2,567,373 A 9/1951 Giacoletto .................. 307/110
2,588,513 A 3/1952 Giacoletto .................. 322/2 R
2,978,066 A 4/1961 Nodolf .......................... 96/87
3,118,022 A 1/1964 Sessler et al. ................ 38/191
3,397,278 A 8/1968 Pomerantz .................. 257/650
3,405,334 A 10/1968 Jewett et al. ............... 361/289
3,487,610 A 1/1970 Brown et al. .................. 96/69

(Continued)

FOREIGN PATENT DOCUMENTS

JP 58-29379 2/1983

(Continued)

OTHER PUBLICATIONS translation of Iwamatsu JP-02-219478; Sep. 1990. Electret Generator.*

(Continued)

*Primary Examiner*—Karl Tamai
(74) *Attorney, Agent, or Firm*—Nixon Peabody LLP

(57) ABSTRACT

A power system includes a member with two or more sections and at least one pair of electrodes. Each of the two or more sections has a stored static charge. Each of the pair of electrodes is spaced from and on substantially opposing sides of the member from the other electrode and is at least partially in alignment with the other electode. At least one of the member and the at least one pair of electrodes is moveable with respect to the other. When at least one of the sections is at least partially between the pair of electrodes, the at least one of the sections has the stored static electric charge closer to one of the pair of electrodes. When at least one of the other sections is at least partially between the pair of electrodes, the other section has the stored static electric charge closer to the other one of the pair of electrodes.

22 Claims, 13 Drawing Sheets

U.S. PATENT DOCUMENTS

| | | | | | |
|---|---|---|---|---|---|
| 3,715,500 | A | | 2/1973 | Sessler et al. | 179/1 DN |
| 3,731,163 | A | | 5/1973 | Shuskus | 317/35 R |
| 3,742,767 | A | | 7/1973 | Bernard et al. | 73/517 B |
| 3,786,495 | A | * | 1/1974 | Spence | 341/33 |
| 3,858,307 | A | | 1/1975 | Yoshimura et al. | 29/594 |
| 3,924,324 | A | | 12/1975 | Kodera | 29/592 |
| 4,047,214 | A | | 9/1977 | Francombe et al. | 357/123 |
| 4,102,202 | A | | 7/1978 | Ferriss | 73/517 R |
| 4,115,914 | A | | 9/1978 | Harari | 29/571 |
| 4,126,822 | A | * | 11/1978 | Wahlstrom | 322/2 A |
| 4,160,882 | A | | 7/1979 | Driver | 179/111 R |
| 4,166,729 | A | | 9/1979 | Thompson et al. | 55/138 |
| 4,285,714 | A | | 8/1981 | Kirkpatrick | 65/40 |
| 4,288,537 | A | | 9/1981 | Crites | 322/2 A |
| 4,375,718 | A | | 3/1983 | Wadsworth et al. | 29/592 E |
| 4,490,772 | A | | 12/1984 | Blickstein | 36/281 |
| 4,504,550 | A | | 3/1985 | Pook | 428/461 |
| 4,513,049 | A | | 4/1985 | Yamasaki et al. | 428/194 |
| 4,581,624 | A | | 4/1986 | O'Connor | 357/26 |
| 4,585,209 | A | | 4/1986 | Aine et al. | 251/129.02 |
| 4,626,263 | A | | 12/1986 | Inoue et al. | 55/155 |
| 4,626,729 | A | | 12/1986 | Lewiner et al. | 310/324 |
| 4,701,640 | A | | 10/1987 | Flygstad et al. | 307/400 |
| 4,716,331 | A | | 12/1987 | Higgins, Jr. | 310/330 |
| 4,736,629 | A | | 4/1988 | Cole | 73/517 R |
| 4,789,504 | A | | 12/1988 | Ohmori et al. | 264/22 |
| 4,789,803 | A | | 12/1988 | Jacobsen et al. | 310/309 |
| 4,794,370 | A | | 12/1988 | Simpson et al. | 340/825 |
| 4,874,659 | A | | 10/1989 | Ando et al. | 428/221 |
| 4,905,701 | A | | 3/1990 | Cornelius | 128/660.01 |
| 4,922,756 | A | | 5/1990 | Henrion | 73/517 R |
| 4,944,854 | A | | 7/1990 | Felton et al. | 204/168 |
| 4,945,068 | A | | 7/1990 | Sugaya | 437/52 |
| 4,958,317 | A | | 9/1990 | Terada et al. | 365/104 |
| 4,996,627 | A | | 2/1991 | Zias et al. | 361/283 |
| 4,997,521 | A | | 3/1991 | Howe et al. | 156/651 |
| 5,020,030 | A | | 5/1991 | Huber | 365/185 |
| 5,050,435 | A | | 9/1991 | Pinson | 73/517 B |
| 5,051,643 | A | | 9/1991 | Dworsky et al. | 210/309 |
| 5,054,081 | A | | 10/1991 | West | 381/191 |
| 5,057,710 | A | | 10/1991 | Nishiura et al. | 317/400 |
| 5,081,513 | A | | 1/1992 | Jackson et al. | 357/23.7 |
| 5,082,242 | A | | 1/1992 | Bonne et al. | 251/129.01 |
| 5,088,326 | A | | 2/1992 | Wada et al. | 73/517 R |
| 5,092,174 | A | | 3/1992 | Reidemeister et al. | 78/517 R |
| 5,095,752 | A | | 3/1992 | Suzuki et al. | 73/517 R |
| 5,096,388 | A | | 3/1992 | Weinberg | 417/322 |
| 5,108,470 | A | | 4/1992 | Pick | 55/126 |
| 5,112,677 | A | | 5/1992 | Tani et al. | 428/240 |
| 5,118,942 | A | | 6/1992 | Hamade | 250/324 |
| 5,129,794 | A | | 7/1992 | Beatty | 417/413 |
| 5,132,934 | A | | 7/1992 | Quate et al. | 365/151 |
| 5,143,854 | A | | 9/1992 | Pirrung et al. | 436/518 |
| 5,156,810 | A | | 10/1992 | Ribi | 422/82.01 |
| 5,164,319 | A | | 11/1992 | Hafeman et al. | 435/291 |
| 5,180,623 | A | | 1/1993 | Ohnstein | 428/209 |
| 5,189,641 | A | | 2/1993 | Arakawa | 365/228 |
| 5,207,103 | A | | 5/1993 | Wise et al. | 73/724 |
| 5,228,373 | A | | 7/1993 | Welsch | 83/24 |
| 5,231,045 | A | | 7/1993 | Miura et al. | 437/62 |
| 5,238,223 | A | | 8/1993 | Mettner et al. | 251/368 |
| 5,256,176 | A | | 10/1993 | Matsuura et al. | 156/643 |
| 5,262,000 | A | | 11/1993 | Welbourn et al. | 55/528 |
| 5,284,179 | A | | 2/1994 | Shikida et al. | 37/334 |
| 5,284,692 | A | | 2/1994 | Bell | 428/69 |
| 5,323,999 | A | | 6/1994 | Bonne et al. | 251/11 |
| 5,334,238 | A | | 8/1994 | Goodson et al. | 95/59 |
| 5,336,062 | A | | 8/1994 | Richter | 417/413 |
| 5,348,571 | A | | 9/1994 | Weber | 96/68 |
| 5,349,492 | A | | 9/1994 | Kimura et al. | 361/283.4 |
| 5,355,577 | A | | 10/1994 | Cohn | 29/592.1 |
| 5,365,790 | A | | 11/1994 | Chen et al. | 73/724 |
| 5,367,429 | A | | 11/1994 | Tsuchitani et al. | 361/280 |
| 5,380,396 | A | | 1/1995 | Shikida et al. | 156/630 |
| 5,392,650 | A | | 2/1995 | O'Brien et al. | 73/517 A |
| 5,417,235 | A | | 5/1995 | Wise et al. | 137/1 |
| 5,417,312 | A | | 5/1995 | Tsuchitani et al. | 188/181 A |
| 5,419,953 | A | | 5/1995 | Chapman | 428/284 |
| 5,441,597 | A | | 8/1995 | Bonne et al. | 216/2 |
| 5,445,008 | A | | 8/1995 | Wachter et al. | 73/24.06 |
| 5,474,599 | A | | 12/1995 | Cheney et al. | 96/55 |
| 5,488,864 | A | | 2/1996 | Stephan | 73/514.32 |
| 5,491,604 | A | | 2/1996 | Nguyen et al. | 36/278 |
| 5,496,507 | A | | 3/1996 | Angadjivand et al. | 264/423 |
| 5,512,882 | A | | 4/1996 | Stetter et al. | 340/632 |
| 5,519,240 | A | | 5/1996 | Suzuki | 257/315 |
| 5,520,522 | A | | 5/1996 | Rathore et al. | 417/322 |
| 5,526,172 | A | | 6/1996 | Kanack | 359/291 |
| 5,567,336 | A | | 10/1996 | Tatah | 219/121.66 |
| 5,578,976 | A | | 11/1996 | Yao | 333/262 |
| 5,591,679 | A | | 1/1997 | Jakobsen et al. | 437/228 |
| 5,593,476 | A | | 1/1997 | Coppom | 95/78 |
| 5,593,479 | A | | 1/1997 | Frey et al. | 96/57 |
| 5,596,194 | A | | 1/1997 | Kubena et al. | 250/306 |
| 5,616,844 | A | | 4/1997 | Suzuki et al. | 73/514.32 |
| 5,635,739 | A | | 6/1997 | Grieff et al. | 257/254 |
| 5,640,133 | A | | 6/1997 | MacDonald et al. | 333/197 |
| 5,668,303 | A | | 9/1997 | Giesler et al. | 73/24.06 |
| 5,671,905 | A | | 9/1997 | Hopkins, Jr. | 251/129.01 |
| 5,677,617 | A | | 10/1997 | Tokai et al. | 323/222 |
| 5,698,771 | A | | 12/1997 | Shields et al. | 73/31.05 |
| 5,739,834 | A | | 4/1998 | Okabe et al. | 347/111 |
| 5,747,692 | A | | 5/1998 | Jacobsen et al. | 73/514.25 |
| 5,771,148 | A | | 6/1998 | Davis | 361/281 |
| 5,777,977 | A | | 7/1998 | Fujiwara et al. | 396/126 |
| 5,788,468 | A | | 8/1998 | Dewa et al. | 417/415 |
| 5,793,485 | A | | 8/1998 | Gourley | 356/318 |
| 5,798,146 | A | | 8/1998 | Murokh et al. | 427/458 |
| 5,807,425 | A | | 9/1998 | Gibbs | 96/66 |
| 5,812,163 | A | | 9/1998 | Wong | 347/68 |
| 5,839,062 | A | | 11/1998 | Nguyen et al. | 455/323 |
| 5,846,302 | A | | 12/1998 | Putro | 96/66 |
| 5,846,708 | A | | 12/1998 | Hollis et al. | 435/6 |
| 5,871,567 | A | | 2/1999 | Covington et al. | 96/58 |
| 5,874,675 | A | | 2/1999 | Edmans et al. | 73/514.21 |
| 5,897,097 | A | | 4/1999 | Biegelsen et al. | 251/129.01 |
| 5,908,603 | A | | 6/1999 | Tsai et al. | 422/186.07 |
| 5,914,553 | A | | 6/1999 | Adams et al. | 310/309 |
| 5,919,364 | A | | 7/1999 | Lebouitz et al. | 210/321.84 |
| 5,920,011 | A | | 7/1999 | Hulsing, II | 73/504.04 |
| 5,941,501 | A | | 8/1999 | Biegelsen et al. | 251/129.01 |
| 5,955,932 | A | | 9/1999 | Nguyen et al. | 333/186 |
| 5,959,516 | A | | 9/1999 | Chang et al. | 334/14 |
| 5,967,163 | A | | 10/1999 | Pan et al. | 137/1 |
| 5,969,250 | A | | 10/1999 | Greiff | 73/514.38 |
| 5,971,355 | A | | 10/1999 | Biegelsen et al. | 251/129.06 |
| 5,993,520 | A | | 11/1999 | Yu | 96/66 |
| 5,994,982 | A | | 11/1999 | Kintis et al. | 333/235 |
| 6,007,309 | A | | 12/1999 | Hartley | 417/322 |
| 6,016,092 | A | | 1/2000 | Qiu et al. | 333/262 |
| 6,032,923 | A | | 3/2000 | Biegelsen et al. | 251/129.01 |
| 6,033,852 | A | | 3/2000 | Andle et al. | 435/6 |
| 6,037,797 | A | | 3/2000 | Lagowski et al. | 324/766 |
| 6,040,611 | A | | 3/2000 | De Los Santos et al. | 257/415 |
| 6,043,727 | A | | 3/2000 | Warneke et al. | 333/205 |
| 6,046,659 | A | | 4/2000 | Loo et al. | 333/262 |
| 6,048,692 | A | | 4/2000 | Maracas et al. | 435/6 |
| 6,051,853 | A | | 4/2000 | Shimada et al. | 257/252 |
| 6,057,520 | A | | 5/2000 | Goodwin-Johansson | 200/181 |
| 6,069,540 | A | | 5/2000 | Berenz et al. | 333/101 |
| 6,089,534 | A | | 7/2000 | Biegelsen et al. | 251/129.01 |
| 6,094,102 | A | | 7/2000 | Chang et al. | 331/17 |
| 6,100,477 | A | | 8/2000 | Randall et al. | 200/181 |
| 6,106,245 | A | | 8/2000 | Cabuz | 417/322 |

| | | | | |
|---|---|---|---|---|
| 6,119,691 | A | 9/2000 | Angadjivand et al. | 128/206.19 |
| 6,120,002 | A | 9/2000 | Biegelsen et al. | 251/129.01 |
| 6,123,316 | A | 9/2000 | Biegelsen et al. | 160/316 |
| 6,124,632 | A | 9/2000 | Lo et al. | 251/129.01 |
| 6,126,140 | A | 10/2000 | Johnson et al. | 257/678 |
| 6,127,744 | A | 10/2000 | Streeter et al. | 307/125 |
| 6,127,812 | A | 10/2000 | Ghezzo et al. | 320/166 |
| 6,149,190 | A | 11/2000 | Galvin et al. | 280/735 |
| 6,168,395 | B1 | 1/2001 | Quenzer et al. | 417/413.3 |
| 6,168,948 | B1 | 1/2001 | Anderson et al. | 435/287.2 |
| 6,170,332 | B1 | 1/2001 | MacDonald et al. | 73/514.38 |
| 6,177,351 | B1 | 1/2001 | Beratan et al. | 438/694 |
| 6,181,009 | B1 | 1/2001 | Takahashi et al. | 257/735 |
| 6,197,139 | B1 | 3/2001 | Ju et al. | 156/99 |
| 6,199,874 | B1 | 3/2001 | Galvin et al. | 280/5.514 |
| 6,204,737 | B1 | 3/2001 | Ellä | 333/187 |
| 6,214,094 | B1 | 4/2001 | Rousseau et al. | 96/15 |
| 6,238,946 | B1 | 5/2001 | Ziegler | 438/50 |
| 6,255,758 | B1 | 7/2001 | Cabuz et al. | 310/309 |
| 6,265,758 | B1 | 7/2001 | Takahashi | 257/637 |
| 6,275,122 | B1 | 8/2001 | Speidell et al. | 333/186 |
| 6,287,776 | B1 | 9/2001 | Hefti | 435/6 |
| 6,324,914 | B1 | 12/2001 | Xue et al. | 73/718 |
| 6,336,353 | B2 | 1/2002 | Matsiev et al. | 73/24.06 |
| 6,384,353 | B1 | 5/2002 | Huang et al. | 200/181 |
| 6,393,895 | B1 | 5/2002 | Matsiev et al. | 73/24.06 |
| 6,395,638 | B1 | 5/2002 | Linnemann et al. | 438/706 |
| 6,423,148 | B1 | 7/2002 | Aoki | 134/3 |
| 6,431,212 | B1 | 8/2002 | Hayenga et al. | 137/855 |
| 6,469,785 | B1 | 10/2002 | Duveneck et al. | 356/244 |
| 6,470,754 | B1 | 10/2002 | Gianchandani | 73/718 |
| 6,485,273 | B1 | 11/2002 | Goodwin-Johansson | 417/410.2 |
| 6,496,348 | B2 | 12/2002 | McIntosh | 36/115 |
| 6,504,118 | B2 | 1/2003 | Hyman et al. | 200/181 |
| 6,580,280 | B2 | 6/2003 | Nakae et al. | 324/717 |
| 6,597,560 | B2 | 7/2003 | Potter | 361/277 |
| 6,626,417 | B2 | 9/2003 | Winger et al. | 251/129.06 |
| 6,638,627 | B2 | 10/2003 | Potter | 428/446 |
| 6,673,677 | B2 | 1/2004 | Hofmann et al. | 438/257 |
| 6,674,132 | B2 | 1/2004 | Willer | 257/370 |
| 6,688,179 | B2 | 2/2004 | Potter et al. | 73/700 |
| 6,707,355 | B1 | 3/2004 | Yee | 335/78 |
| 6,717,488 | B2 | 4/2004 | Potter | 333/186 |
| 6,734,770 | B2 | 5/2004 | Aigner et al. | 335/78 |
| 6,750,590 | B2 | 6/2004 | Potter | 310/309 |
| 6,773,488 | B2 | 8/2004 | Potter | 95/59 |
| 6,787,438 | B1 | 9/2004 | Nelson | 438/584 |
| 6,798,132 | B2 | 9/2004 | Satake | 313/495 |
| 6,841,917 | B2 | 1/2005 | Potter | 310/309 |
| 6,842,009 | B2 | 1/2005 | Potter | 324/633 |
| 6,854,330 | B2 | 2/2005 | Potter | 73/514.25 |
| 2001/0047689 | A1 | 12/2001 | McIntosh | 73/514.37 |
| 2002/0000649 | A1 | 1/2002 | Tilmans et al. | 257/678 |
| 2002/0012937 | A1 | 1/2002 | Tender et al. | 435/6 |
| 2002/0072201 | A1 | 6/2002 | Potter | 438/455 |
| 2002/0131228 | A1 | 9/2002 | Potter | 361/233 |
| 2002/0131230 | A1 | 9/2002 | Potter | 361/277 |
| 2002/0182091 | A1 | 12/2002 | Potter | 417/413.3 |
| 2002/0185003 | A1 | 12/2002 | Potter | 95/57 |
| 2002/0187618 | A1 | 12/2002 | Potter | 438/455 |
| 2002/0197761 | A1 | 12/2002 | Patel et al. | 438/52 |
| 2003/0079543 | A1 | 5/2003 | Potter | 73/54.32 |
| 2003/0079548 | A1 | 5/2003 | Potter et al. | 73/753 |
| 2003/0080839 | A1 | 5/2003 | Wong | 335/78 |
| 2003/0081397 | A1 | 5/2003 | Potter | 361/807 |
| 2003/0112096 | A1 | 6/2003 | Potter | 333/186 |
| 2003/0201784 | A1 | 10/2003 | Potter | 324/663 |
| 2004/0023236 | A1 | 2/2004 | Potter et al. | 435/6 |
| 2004/0145271 | A1 | 7/2004 | Potter | 310/309 |
| 2005/0035683 | A1 | 2/2005 | Raisanen | 310/311 |
| 2005/0044955 | A1 | 3/2005 | Potter | 73/514.32 |
| 2005/0079640 | A1 | 4/2005 | Potter | 438/19 |
| 2005/0186117 | A1 | 8/2005 | Uchiyama et al. | 422/91 |
| 2005/0205966 | A1 | 9/2005 | Potter | 257/532 |

FOREIGN PATENT DOCUMENTS

| | | | |
|---|---|---|---|
| JP | 62-297534 | | 12/1987 |
| JP | 2-219478 | | 9/1990 |
| JP | 4-236172 | | 8/1992 |
| JP | 08-308258 | * | 11/1996 |
| JP | 2000-304567 A | | 11/2000 |

OTHER PUBLICATIONS

"Experimental Characteristics of Electret Generator Using Polymer Film Electrets", Tada, Jpn. J. Appl. Phys. vol. 31, p. 846-851, Mar. 1992.*

"An Electret Based Electrostatic u-Generator", Sterken et al., $12^{th}$ International Conference on Solid State Sensors Actuators and Microsystems, Boston, MA, Jun. 2003.*

"Design and Optimization of A Mems Electred Based Capacitive Energy Scavenger", Peano et al., Journal of Electromechanical Systems, vol. 14, No. 3, Jun. 2005.*

"Improvement of Conventional Electret Motors", Tada, IEEE Transactions of Electrical Insulation, vol. 28, Jun. 1993.*

"Design and Modeling of a micro-energy harvester using an embedded charge layer", Gracewski et al., J Micromech. Microeng. 16 (2006), p. 235-241.*

"Electrostatic Current Generator Having a Disk Electret as an Active Element", Jefimenko et al., Transactions on Industry Applications, vol. 1A-14, No. 6, Nov./Dec. 1978.*

"High Power Electrostatic Motor and Generator Using Electrets", Genda et al., 12th International Conference on Solid State Sensors Actuators and Microsystems, Boston, MA, Jun. 2003.*

Aguilera et al., "Electron Energy Distribution at the Insulator-Semiconductor Interface in AC Thin Film Electroluminescent Display Devices," *IEEE Transactions on Electron Devices* 41(8):1357-1363 (1994).

Brown, et al., "A Varactor-Tuned RF Filter," *IEEE Trans. on MTT*, pp. 1-4 (1999).

Cass, S., "Large Jobs for Little Devices," *IEEE Spectrum*, pp. 72-73 (2001).

Cui, Z., "Basic Information in Microfluidic System: A Knowledge Base for Microfluidic Devices," retrieved from the internet at http://web.archive.org/web/20011015071501/http://www.ccmicro.rl.ac.uk/info_microfluid ics.html (Oct. 15, 2001).

ILIC et al., "Mechanical Resonant Immunospecific Biological Detector," *Appl. Phys. Lett.* 77(3):450-452 (2000).

ILIC et al., "Single Cell Detection with Micromechanical Oscillators," *J. Vac. Sci. Technol. B* 19(6):2825-2828 (2001).

Judy et al., "Surface Machined Micromechanical Membrane Pump," *IEEE*, pp. 182-186 (1991).

Kobayashi et al., "Distribution of Trapped Electrons at Interface State in ACTFEL Devices," *in* Proceedings of the Sixth International Workshop on Electroluminescence, El Paso, Texas, May 11-13 (1992).

Laser & Santiago, "A Review of Micropumps," *J. Micromech. Microeng.* 14:R35-R64 (2004).

Shoji & Esashi, "Microflow Devices and Systems," *J. Micromech. Microeng.* 4:157-171 (1994).

http://ucsub.colorado.edu/~maz/research/background.html [Retrieved from Web site on Apr. 4, 2001].

"Low-Power, High-Performance MEMS-Based Switch Fabric," *at* http://www.ece.ncsu.edu/erl/damemi/switchproj.html [Retrieved from Web site on Apr. 4, 2001].

http://www.eecs.umich.edu/RADLAB/bio/rebeiz/Current_Research.html [Retrieved from Web site on Apr. 4, 2001].

"MEMS Technology Developers," *at* http://www.ida.org/DIVISIONS/std/MEMS/tech_fluids.html [Retrieved from the internet on Jun. 13, 2002].

* cited by examiner

ROTATIONAL MOTION BASED, ELECTROSTATIC POWER SOURCE AND METHODS THEREOF

This application is a continuation-in-part application of U.S. patent application Ser. No. 10/280,304 filed Oct. 24, 2002 now U.S. Pat. No. 6,750,590 which claims the benefit of U.S. Provisional Patent Application Ser. No. 60/338,163, filed Oct. 26, 2001, which are both hereby incorporated by reference in their entirety.

This invention was made with Government support under Grant No. DEFG02-02ER63410.A100, awarded by the Department of Energy on Oct. 1, 2002. The Government has certain rights in the inventions.

FIELD OF THE INVENTION

This invention relates generally to power sources and, more particularly, to an electrostatic based power source and a methods thereof.

BACKGROUND OF THE INVENTION

There are a growing number of devices which require portable power sources. A variety of different types of portable power sources are available.

One of these types of portable power sources is batteries. For most applications batteries provide an adequate source of power. Unfortunately, batteries have finite lifetime and thus require periodic replacement.

Another type of portable power source are solar powered systems. Solar power systems also provide an adequate amount of power and provide a recharging mechanism. Unfortunately, the recharging mechanism requires solar radiation, which may not always be available and requires proper orientation to the solar radiation, which may not always be convenient.

SUMMARY OF THE INVENTION

A power system in accordance with one embodiment of the present invention includes a housing with a chamber, a member with a stored static electrical charge, and a pair of electrodes. The member is connected to the housing and extends at least partially across the chamber. The pair of electrodes are connected to the housing, are spaced from and on substantially opposing sides of the member from each other, and are at least partially in alignment with each other. The member is movable with respect to the pair of electrodes or one of the pair of electrodes is movable with respect to the member.

A method of making a power system in accordance with another embodiment of the present invention includes providing a housing with a chamber, providing a member with a stored static electrical charge, and providing a pair of electrodes connected to the housing. The member is connected to the housing and extends at least partially across the chamber. The pair of electrodes are spaced from and on substantially opposing sides of the member and are at least partially in alignment with each other. The member is movable with respect to the pair of electrodes or one of the pair of electrodes is movable with respect to the member.

A method for generating power in accordance with another embodiment of the present invention includes moving a member with a stored static electrical charge with respect to at least one of a pair of electrodes or one of the pair of electrodes with respect to the member, inducing a potential on the pair of electrodes as a result of the moving, and outputting the induced potential.

A power system in accordance with embodiments of the present invention includes a member with two or more sections and at least one pair of electrodes. Each of the two or more sections has a stored static charge. Each of the pair of electrodes is spaced from and on substantially opposing sides of the member from the other electrode and is at least partially in alignment with the other electode. At least one of the member and the at least one pair of electrodes is moveable with respect to the other. When at least one of the sections is at least partially between the pair of electrodes, the at least one of the sections has the stored static electric charge closer to one of the pair of electrodes. When at least one of the other sections is at least partially between the pair of electrodes, the other section has the stored static electric charge closer to the other one of the pair of electrodes.

A method of making a power system in accordance with embodiments of the present invention includes providing a member with two or more sections and providing at least one pair of electrodes. Each of the two or more sections has a stored static charge. Each of the pair of electrodes is spaced from and on substantially opposing sides of the member from the other electrode and is at least partially in alignment with the other electode. At least one of the member and the at least one pair of electrodes is moveable with respect to the other. When at least one of the sections is at least partially between the pair of electrodes, the at least one of the sections has the stored static electric charge closer to one of the pair of electrodes. When at least one of the other sections is at least partially between the pair of electrodes, the other section has the stored static electric charge closer to the other one of the pair of electrodes.

A method for generating power in accordance with embodiments of the present invention includes moving at least one of a member and at least one pair of electrodes with respect to the other, inducing a potential on the pair electrodes as a result of the moving, and outputting the induced potential. The member comprises two or more sections where each of the sections has a stored static electrical charge. When at least one of the sections is at least partially between the pair of electrodes, the at least one of the sections has the stored static electric charge closer to one of the pair of electrodes. When at least one of the other sections is at least partially between the pair of electrodes, the other section has the stored static electric charge closer to the other one of the pair of electrodes.

The present invention provides a power system which is compact, easy to use, and easy to incorporate in designs. This power system is renewable without requiring replacement of the system and without the need for solar radiation or proper orientation to solar radiation. Instead, the present invention is able to effectively extract energy, and hence power, from the sensor local environment. By way of example only, the environment may include local earth ambient, vibrational energy from machines or motion from animals or humans, fluid motion such as wind or waves, manual rotation.

DETAILED DESCRIPTION

Figure 10:
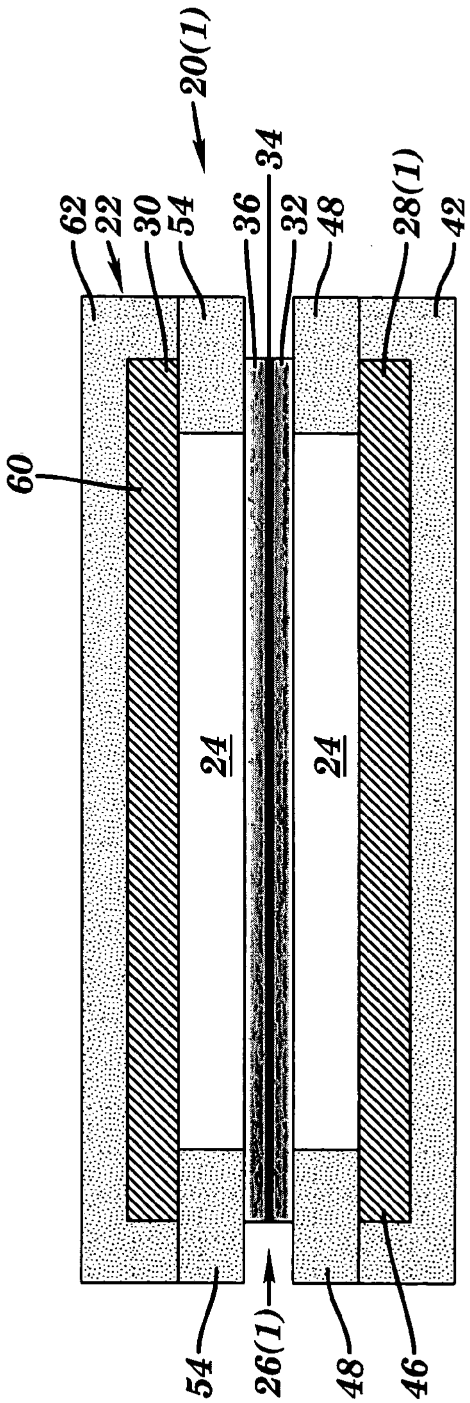
Figure 11:
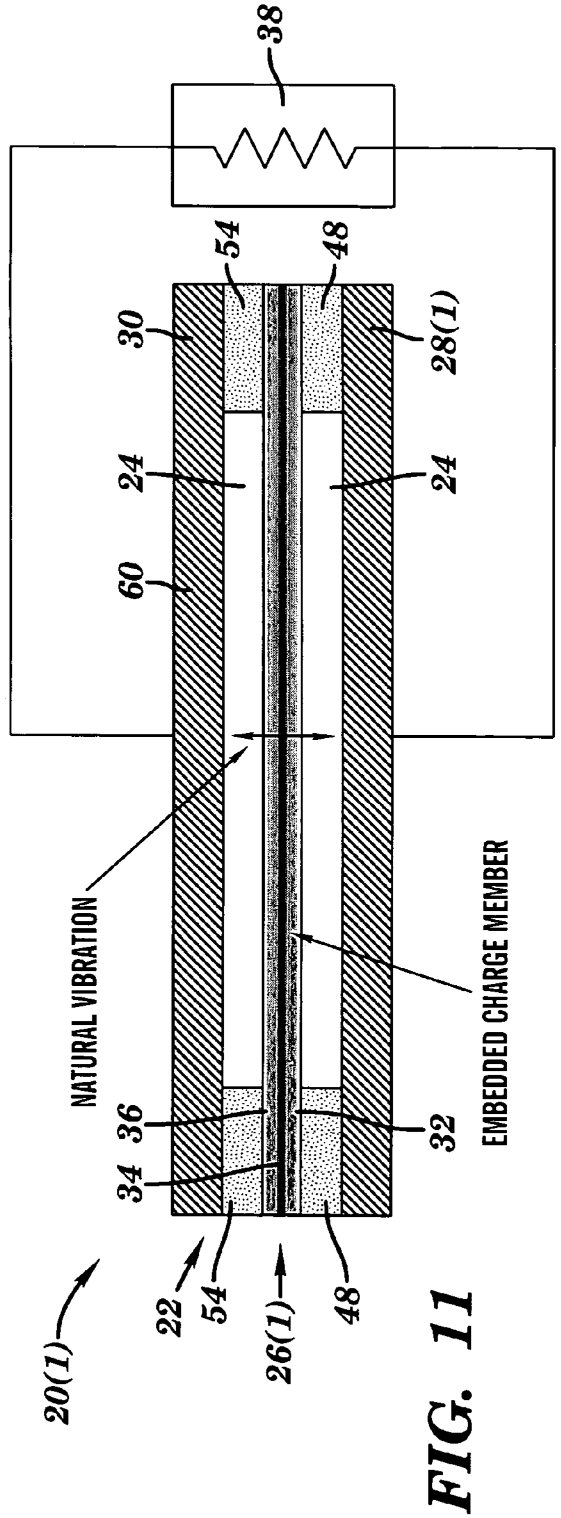
FIG. 11 is a side, cross-sectional view of the electrostatic power source shown in FIG. 10 coupled to a load.

A power system 20(1) in accordance with one embodiment of the present invention is illustrated in FIGS. 10 and 11. The power system 20(1) includes a housing 22 with a chamber 24, a member 26(1) with a stored static electrical charge, and a pair of electrodes 28(1) and 30. The present invention provides a power system 20(1) which is compact, easy to use, and easy to incorporate in designs.

Referring to FIGS. 10 and 11, the housing 22 has an internal chamber 24 and is made of a variety of layers, although other types of supporting structures in other configurations and other numbers of layers, such as one or more, made of other materials can be used. The size of the housing 22 and of the chamber 24 can vary as required by the particular application.

Figure 12:
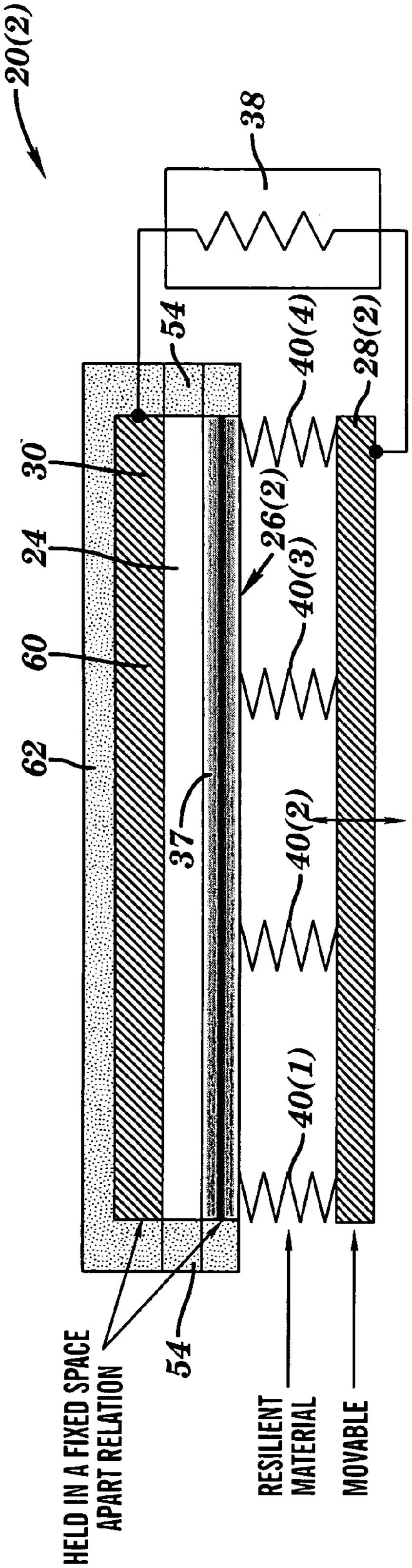
FIG. 12 is a side, cross-sectional view of an electrostatic power source with an electrode in accordance with another embodiment of the present invention.

The member 26(1) extends across the chamber 24 and is connected on opposing sides to an inner wall of the housing 22, although other arrangements can be used, such as having the member 26(1) secured at along one end or edge with the another end or edge space from the inner wall of the chamber 24 or connected on all sides or edges to the inner wall of the chamber 24 like a diaphragm. Each of the first and second electrodes 28(1) and 30 is initially spaced substantially the same distance from the member 26(1), although other configurations can be used. The chamber 24 is sealed with a fluid, such as air, although other types of fluids and/or materials can be used or the chamber or the chamber can be sealed in a vacuum. The position of the member 26(1) can be altered as a result of a movement of power system 20(1), although other configurations can be used, such as having the member 26(1) being fixed and one of the pair of electrodes 28(2) whose position can be altered as a result of a movement of power system 20(2) as shown in FIG. 12.

The member 26(1) can store a fixed static electrical charge, although member 26(1) can store other types of charge, such as a floating electrical charge. The member 26(1) has a pair of dissimilar layers 32 and 36 of dielectric material, such as silicon oxide, silicon dioxide, silicon nitride, aluminum oxide, tantalum oxide, tantalum pentoxide, titanium oxide, titanium dioxide, barium strontium titanium oxide, calcium fluoride, and magnesium fluoride, although other types of and combinations of materials which can hold a charge and other numbers of layers, such as a member 26(2) with one layer 37 as shown in FIG. 12 or three or more layers can be used. The layers 32 and 36 are seated against each other along an interface 34 were the static electrical charge is stored. The member 26(1) can hold a fixed charge along the interface on the order of at least $1\times10^{10}$ charges/cm$^2$ and forms a structure with a monopole charge, such as electrons, at the interface. In this particular embodiment, a negative charge from the electrons is stored at the interface, although other arrangements could be used.

The pair of electrodes 28(1) and 30 are located in the inner walls of the housing 22 in chamber 24, although other configurations for connecting the pair of electrodes 28(1) and 30 to the housing 22 can be used, such as having each of the first and second electrodes 28(1) and 30 located in the inner wall of the housing 22 and spaced from the chamber 24 by one or more layers of material, such as an insulating material, or by having each of the first and second electrodes 28(1) and 30 seated on the inner walls of the housing 22 in the chamber 24. The first and second electrodes 28(1) and 30 are in substantial alignment with each other and are spaced from and located on a substantially opposing sides of the member 26(1), although other configurations can be used. By way of example only, the distance between each of the pair of electrodes 28(1) and 30 is about 1.0 microns, although this distance can vary. Depending on the material and/or fluid in the chamber 24, such as air or a vacuum, the electrodes 28(1) and 30 will be spaced different distances from the member 26(1). In this particular embodiment, this spacing is determined so that the electrodes 28(1) and 30 with respect to the member 26(1) have equal amounts of induced electrical charge at an initial state, although other arrangements can be used.

A load 38, such as a cell phone or a pager, is coupled to the pair of electrodes 28(1) and 30, although other types of devices can be coupled to the electrodes 28(1) and 30, such as a device which uses and/or stores the generated power.

Referring to FIG. 12, a power system 20(2) in accordance with another embodiment is shown. Elements in FIG. 12 which are like elements shown and described in FIGS. 1–11 will have like numbers and will not be shown and described in detail again here. The member 26(2) comprises a single layer 37 of dielectric material, such as silicon oxide, silicon dioxide, silicon nitride, aluminum oxide, tantalum oxide, tantalum pentoxide, titanium oxide, titanium dioxide, barium strontium titanium oxide, calcium fluoride, and magnesium fluoride, in which the static electrical charge is held, although the member 26(2) can have other numbers of layers. The member 26(2) extends across the chamber 24 and is connected on opposing sides to an inner wall of the housing 22, although other arrangements can be used, such as having the member 26(2) secured at along one end or edge with the another end or edge space from the inner wall of the chamber 24. The position of one of the pair of electrodes 30 with respect to the member 26(2) is fixed and the position of the other one of the electrodes 28(2) with respect to the member 20(2) can be altered as a result of a movement of power system 20(2), although other configurations can be used. The space in chamber 24 between member 26(2) and electrode 30 is filled with a layer of dielectric material, although the space could be filled with other fluids and/or materials, such as air or a vacuum could be used.

A resilient device 40, such as a spring or a resilient material, is provided between the member 26(2) and the electrode 28(2), although the space between the member 26(2) and electrodes 28(2) and 30 can be filled with other types of resilient devices or materials. The resilient device 40 is used to move the electrode 28(2) back to an initial position when the electrode 28(2) has been moved as a result of some other movement.

A load 38, such as a cell phone or a pager, is coupled to the pair of electrodes 28(1) and 30, although other types of devices can be coupled to the electrodes 28(1) and 30, such as a device which uses and/or stores the generated power.

By way of example only, the power system 20(2) could be incorporated in a variety of devices, such as in a heel of a boot. The electrode 28(1) may be located in the sole of the boot and would be pushed towards the member 26(1) every time a step was taken. When the sole of the boot was lifted off the ground, then the resilient devices 40(1)–40(4) would push the electrode 28(1) back away from the electrode 26(1). As a result, the power system 20(2) could generate power as someone was walking for a variety of different types of devices.

Figure 13:
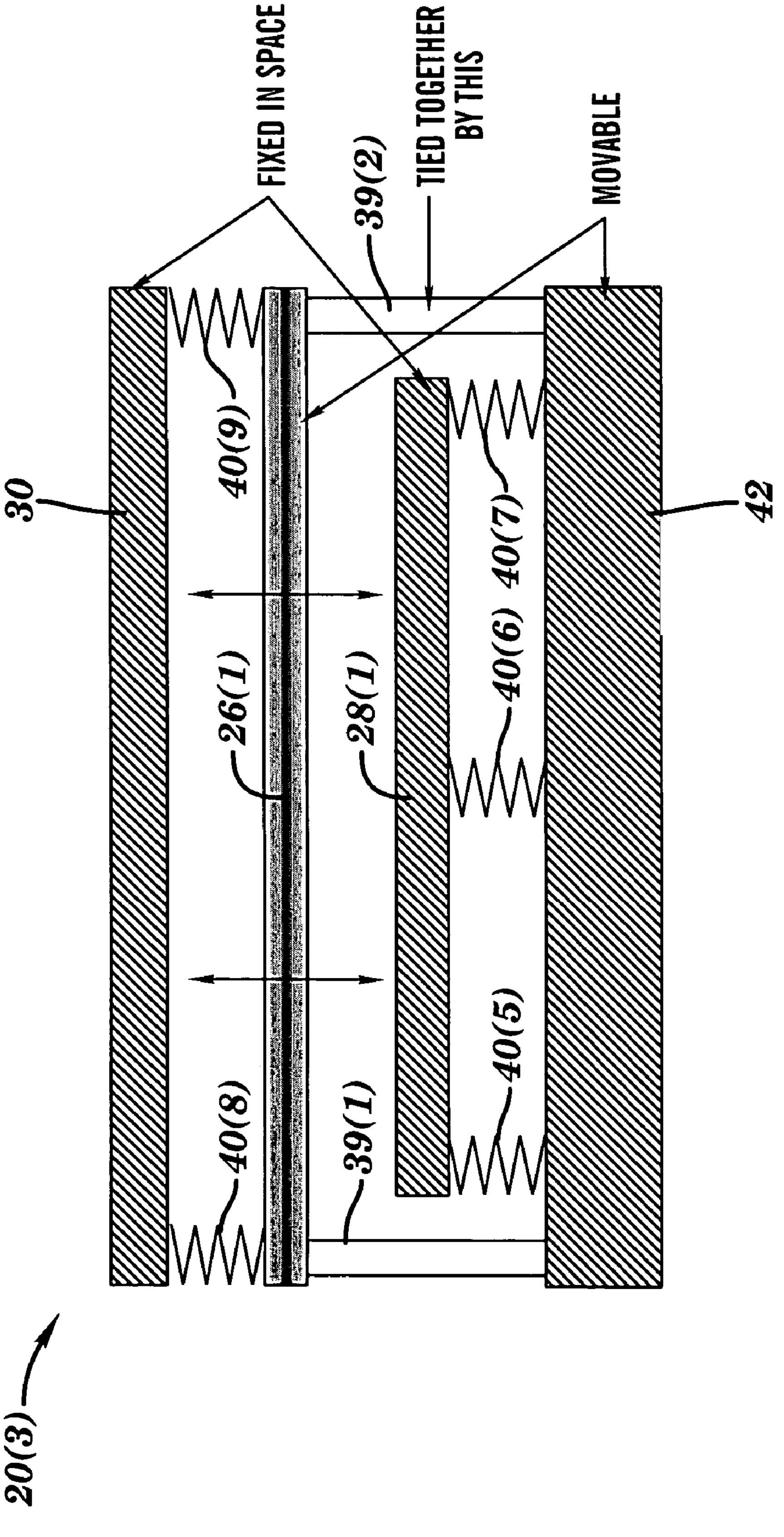
FIG. 13 is a side, cross-sectional view of an electrostatic power source with a movable member and base in accordance with another embodiment of the present invention.

Referring to FIG. 13, a power system 20(3) in accordance with another embodiment is shown. Elements in FIG. 13 which are like elements shown and described in FIGS. 1–11 will have like numbers and will not be shown and described in detail again here. In this particular embodiment, the electrodes 28(1) and 30 are connected to the housing 22, member 26(1) is connected to a substrate 42 with supports 39(1) and 39(2), resilient devices 40(5)–40(7), such as springs, are coupled between electrode 28(1) and substrate 30, and resilient devices 40(8) and 40(9), such as springs, are connected between electrode 30 and member 26(1), although other configurations, materials, and devices can be used.

Figure 14:
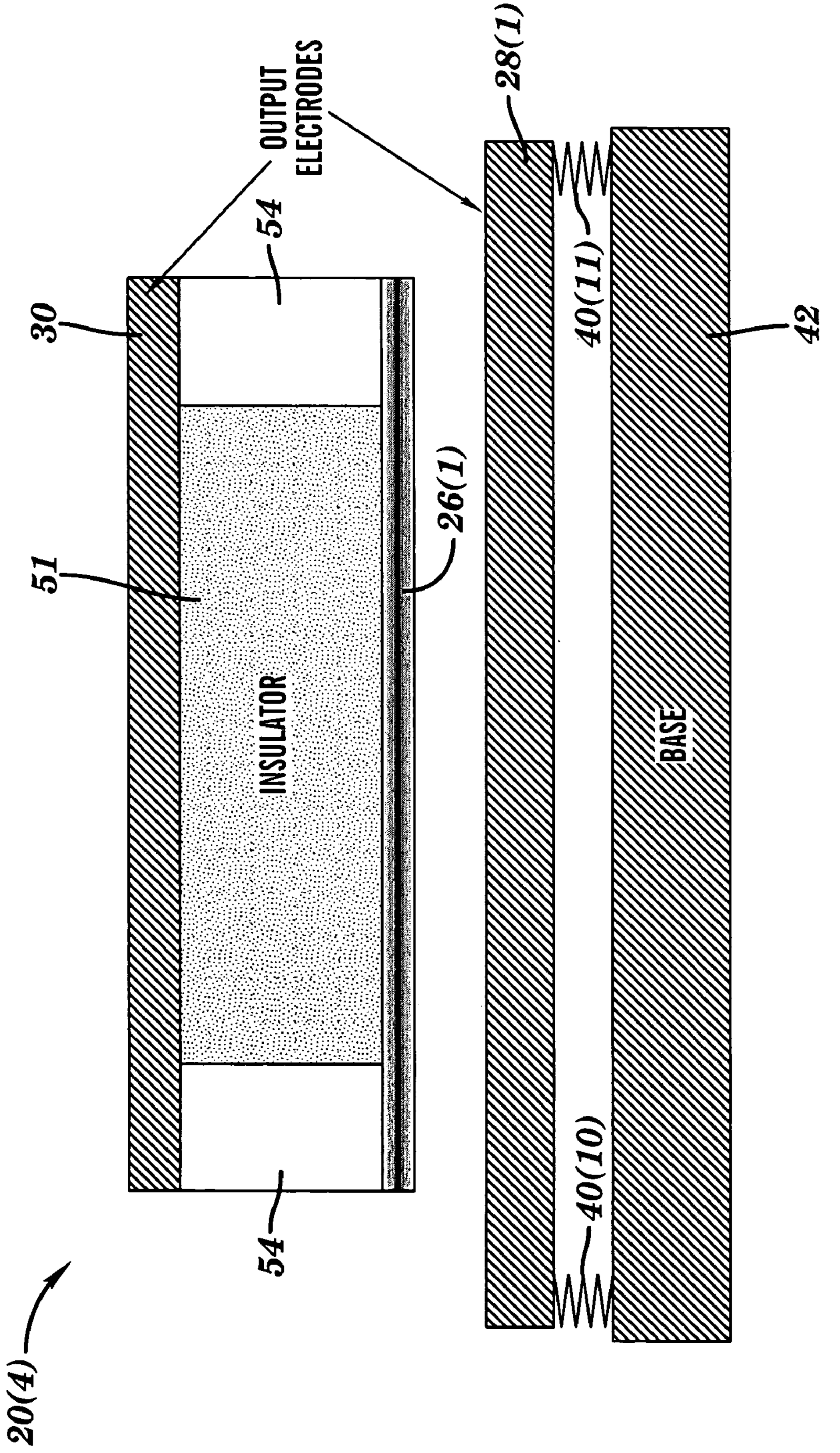
FIG. 14 is a side, cross-sectional view of an electrostatic power source with a movable member and base in accordance with another embodiment of the present invention.

Referring to FIG. 14, a power system 20(4) in accordance with another embodiment is shown. Elements in FIG. 14 which are like elements shown and described in FIGS. 1–11 will have like numbers and will not be shown and described in detail again here. In this particular embodiment, an insulating material 51 is between and connects electrode 30 and member 26(1) and resilient devices 40(10) and 40(11) are coupled between electrode 30 and substrate 42, although other configurations, materials, and devices can be used.

Figure 15:
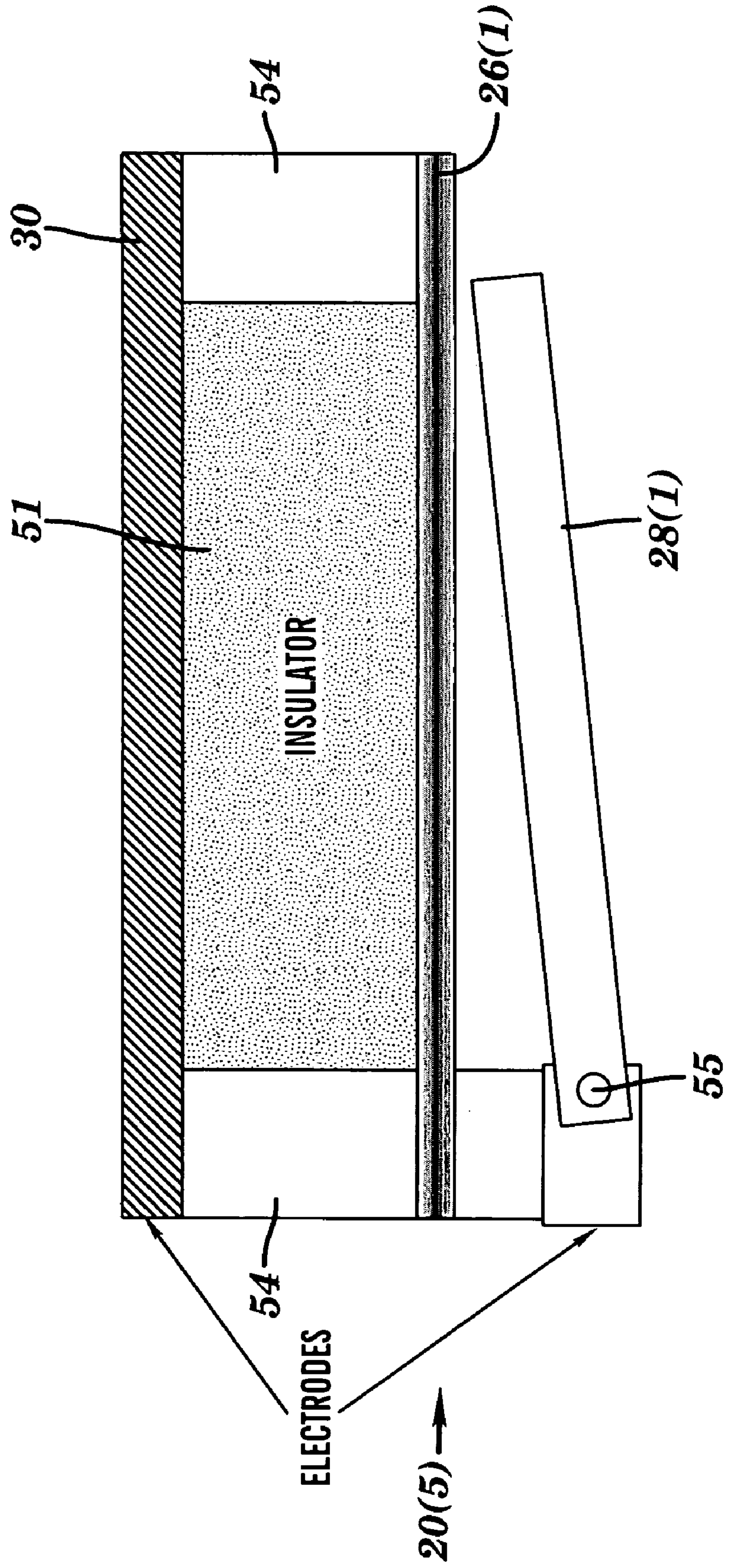
FIG. 15 is a side, cross-sectional view of an electrostatic power source with a movable member and base in accordance with another embodiment of the present invention.
Figure 16:
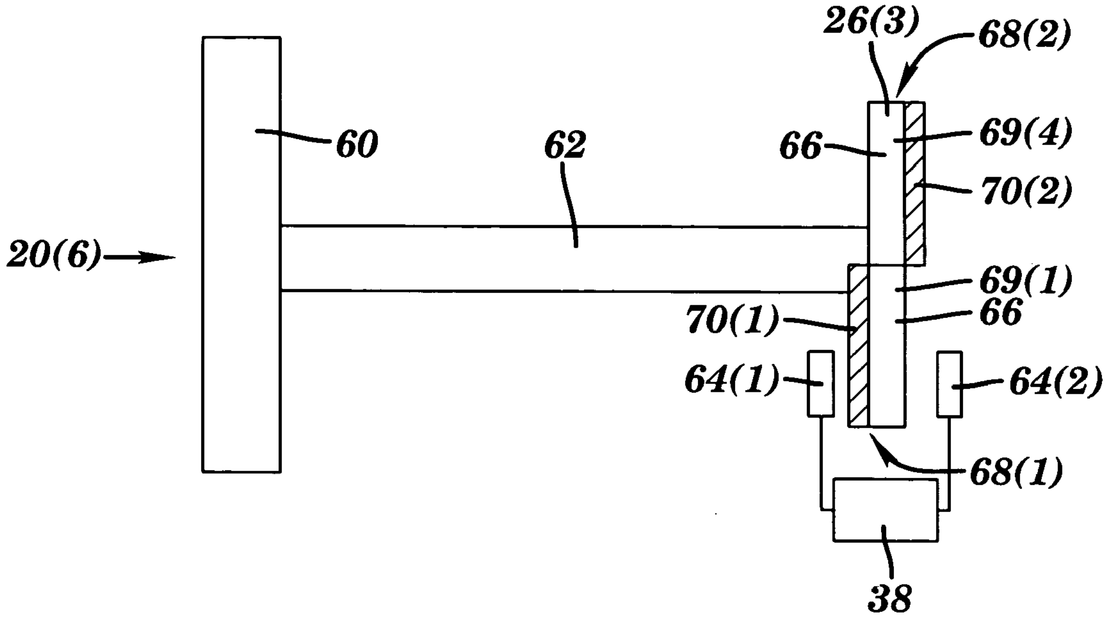
FIG. 16 is a cross-sectional diagram of a power system in accordance with another embodiment of the present invention.
Figure 17:
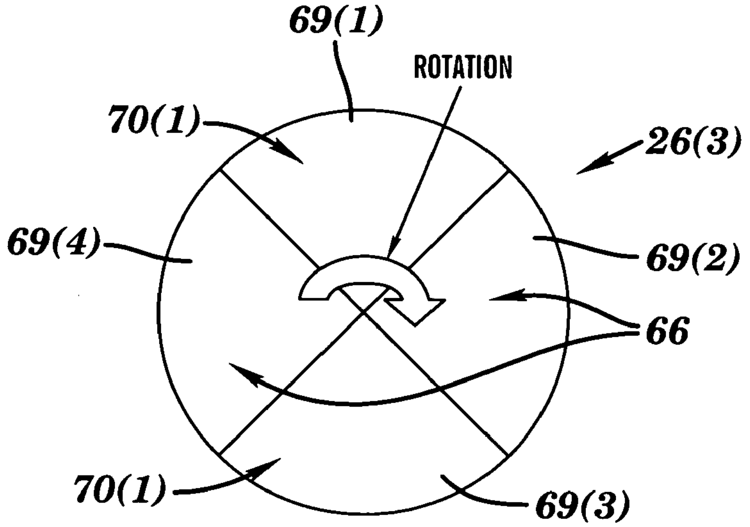
FIG. 17 is a side view of the embedded charge member for the power system shown in FIG. 16.
Figure 18A:
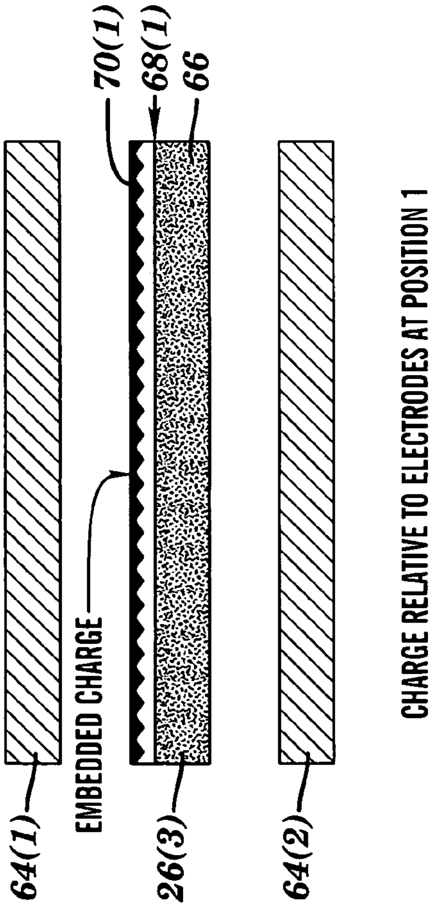
FIG. 18A is side view of a portion of the embedded charge member shown in FIG. 17 in a first position between a pair of electrodes.
Figure 18B:
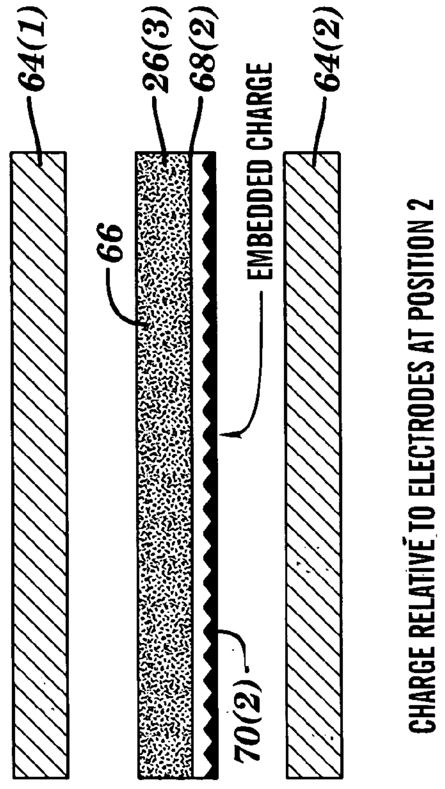
FIG. 18B is side view of a portion of the embedded charge member shown in FIG. 17 in a second position between a pair of electrodes.

Referring to FIG. 15, a power system 20(5) in accordance with another embodiment is shown. Elements in FIG. 15 which are like elements shown and described in FIGS. 1–11 will have like numbers and will not be shown and described in detail again here. In this particular embodiment, an insulating material 51 is between electrode 30 and member 26(1) and at one end the member 30 is pivotally connected at a pivotal connection 55 to the housing 22, although other configurations, materials, and devices can be used.

Referring to FIGS. 16–18B, a power system 20(6) in accordance with another embodiment is illustrated. A propeller 60 is seated on one portion of a rotatable shaft 62 and a member 26(3) seated on another portion of the shaft 62, although other types of components, such as another device which could rotate or move the member 26(3) with or without a shaft 62 in response to the motion of a fluid or by manual rotation or a rotation or movement of the electrodes 64(1) and 64(2) with respect to the member 26(3), in other arrangements could be used. When a fluid, such as air or water, strikes the propeller 60, the propeller begins to rotate which causes the shaft 62. The rotation of the shaft 62 rotates the member 26(3) through the electrodes 64(1)–64(2).

The member 26(3) has a substantially circular shape and has a substantially uniform thickness, although the member 26(3) could have other shapes and thicknesses. The member 26(3) is also divided into four section 69(1)–69(4) which are each substantially the same size, although the member 26(3) could have other configurations, such as greater or lesser numbers of sections. Each of the sections 69(1)–69(4) has a first insulating layer 66, such as $SiO_2$ by way of example only, seated on second insulating layers 70(1) and 70(2), such as $Si_3N_4$ by way of example only, with an interface 68(1) between the layers 66 and 70(1) and an interface 68(2) between layers 66 and 70(2). The thickness of the first insulating layer 66 is greater than the thickness of each of the second insulating layers 70(1) and 70(2) so the interface 68 is closer to the outer surface of each of the second insulating layers 70(1) and 70(2) than to the outer surface of the first insulating layer 66, although other configurations could be used. The sections 69(1) and 69(3) are substantially the same and have the first insulating layer 66 facing the electrode 64(2) and the second insulating layer 70(1) facing the electrode 64(1) when the sections rotate through the electrodes 64(1)–64(2). The sections 69(2) and 69(4) are substantially the same and have the second insulating layer 70(2) facing the electrode 64(2) and the first insulating layer 66 facing the electrode 64(1) when the sections rotate through the electrodes 64(1)–64(2). The layer 66 and layer 70(1) comprises a pair of dissimilar insulators and the layer 66 and layer 70(2) also comprises a pair of dissimilar insulators. Each of the layers 66 and 70 is made of a dielectric material, such as silicon oxide, silicon dioxide, silicon nitride, aluminum oxide, tantalum oxide, tantalum pentoxide, titanium oxide, titanium dioxide, barium strontium titanium oxide, calcium fluoride, and magnesium fluoride, although other types of materials which can hold a charge and other numbers of layers for member 26(3) can be used.

The member 26(3) can store a fixed static electrical charge at the interfaces 68(1) and 68(2), although member 26(3) can store other types of charge, such as a floating electrical charge. More specifically, the member 26(3) can hold a fixed charge on the order of at least $1\times10^{10}$ charges/$cm^2$. The member 26(3) forms a structure with a monopole charge, such as electrons, stored at the interface 68(1) between layers 66 and 70(1) and at the interface 68(2) between layers 66 and 70(2), although other arrangements could be used.

Electrodes 64(1)–64(2) are positioned on opposing sides of member 26(3), are substantially in alignment, and spaced substantially the same distance from the member 26(3), although other numbers of pairs of electrodes could be used and the electrodes could be arranged in other configurations. By way of example only, the distance between each of the pair of electrodes 64(1)–64(2) from the member 26(3) is about 1.0 mm, although this distance can vary. Depending on which of the sections 69(1)–69(4) is between the electrodes 64(1)–64(2), the electrodes 64(1)–64(2) will be spaced different distances from the interfaces 68(1) and 68(2) in the member 26(3) where the stored, fixed, static, monopole charge resides.

A load 38 is coupled to the pair of electrodes 64(1) and 64(2), although other types of devices can be coupled to the electrodes 64(1) and 64(2), such as a device which uses and/or stores the generated power.

Figure 1:
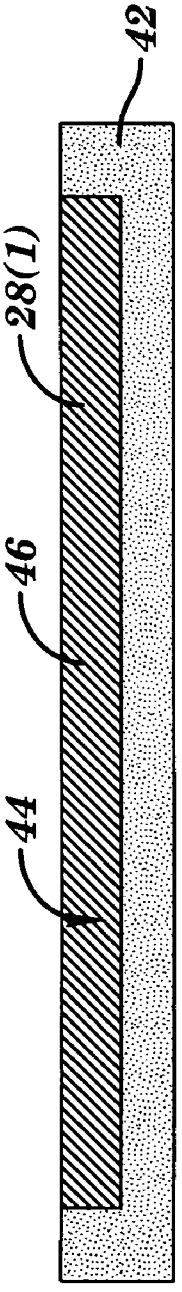
FIGS. 1–10 are side, cross-sectional view of a method for making an electrostatic power source in accordance with one embodiment of the present invention.

A method for making a power system 20(1) in accordance with one embodiment of the present invention is described below with reference to FIGS. 1–11. To make a power system 20(1) a suitable substrate 42, such as silicon oxide on silicon, is provided as shown in FIG. 1, although other types of materials could be used. A first trench 44 is formed in the substrate 42 and the first trench 44 is filled with a first conductive layer 46, such as aluminum, although other types of materials could be used. The first conductive layer 46 may be planarized so that only the first trench 44 is filled with the first conductive layer 46. By way of example, this may be done by standard chemical mechanical planarization (CMP) processing, although other techniques can be used. The resulting first conductive layer 46 in the first trench 44 forms the first electrode 28(1).

Figure 2:
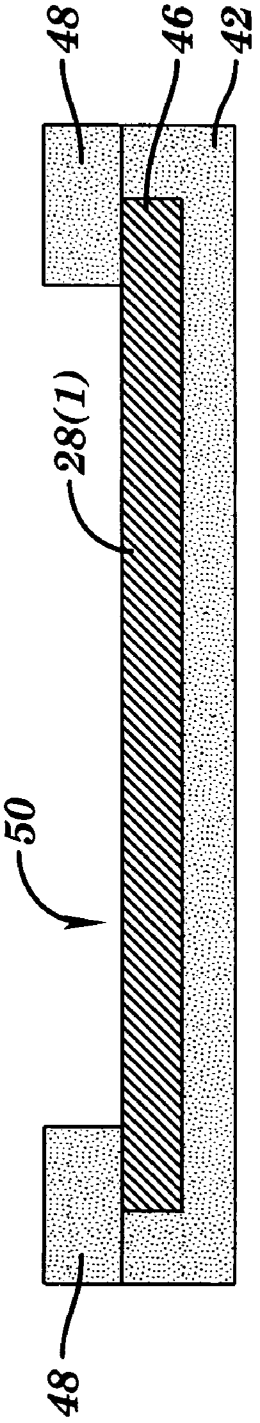

Referring to FIG. 2, a first insulating layer 48, such as silicon dioxide, is deposited on the first conductive layer 46 and a portion of the substrate 42, although other types of materials could be used. A second trench 50 is formed in the first insulating layer 48 which is at least in partial alignment with the first electrode 28(1). The second trench 50 is etched to the surface of the first electrode 28(1), although other configurations can be used, such as leaving a portion of the first insulating layer 48 over the first electrode 28(1).

Figure 3:
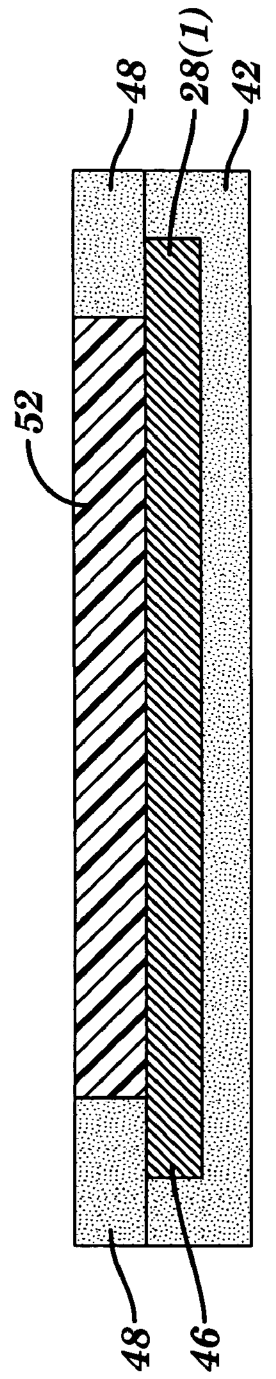

Referring to FIG. 3, the second trench 50 is filled with a first sacrificial layer 52, such as polysilicon, although other types of materials can be used, and the first sacrificial layer 52 may be planarized. By way of example, the planarizing of the first sacrificial layer 52 may be done by standard CMP processing, although other techniques can be used.

Figure 4:
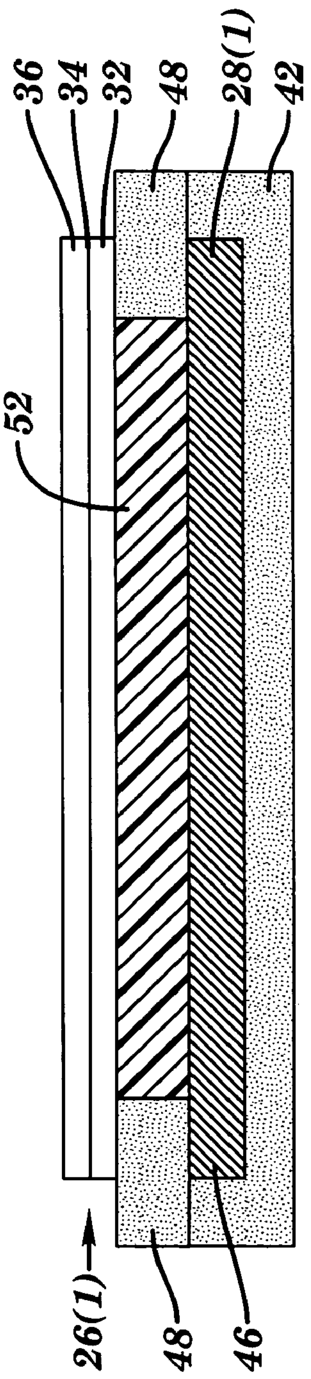

Referring to FIG. 4, a member 26(1) which can store a fixed electronic charge is deposited on a portion of the first insulating layer 48 and the first sacrificial material 52. The member 26(1) has two layers 32 and 36 of insulating material, such as silicon oxide and silicon nitride, and silicon oxide and aluminum oxide, and an interface 34 between the layers 32 and 36, although other combination of materials that can store fixed charge can be deposited as the member 26(1) and other numbers of layers can be used. Additionally, the member 26(1) may comprise other numbers of layers of material, such as a member 26(2) with a single layer 37 shown in FIG. 12 or multiple layers. For example, a tri-layer of silicon oxide—silicon nitride—silicon oxide may be used. The member 26(1) can move towards and away from the first electrode 28(1) and the second electrode 30, although other arrangements can be used, such as shown in FIG. 12 where the member 26(2) is fixed with respect to one of the electrodes 30 and one of the electrodes 28(2) can move with respect to member 26(2) and the other electrode 30.

Figure 5:
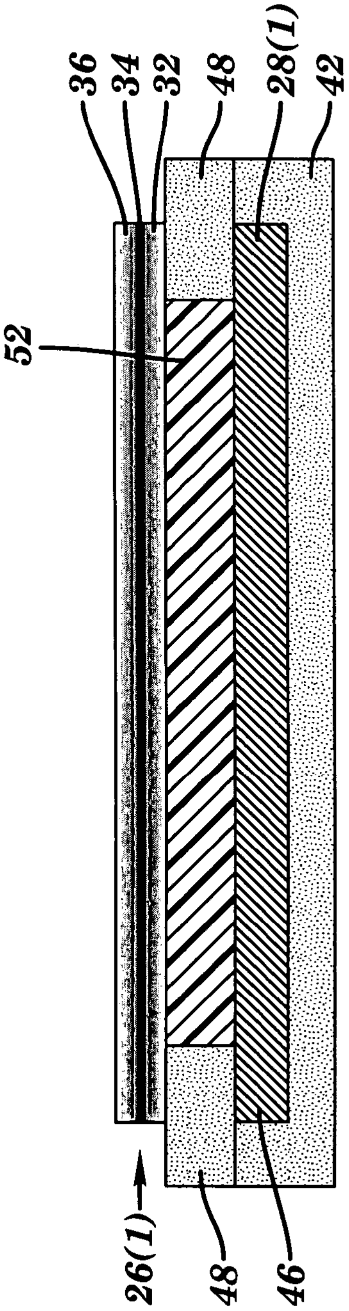

Referring to FIG. 5, electronic charge is injected into the member 26(1). A variety of techniques for injecting charge can be used, such as a low to medium energy ballistic electron source or by utilizing a sacrificial conductive layer (not shown) disposed on top of the member 26(1) and subsequently applying an electric field sufficient to inject electrons into the member 26(1).

Figure 6:
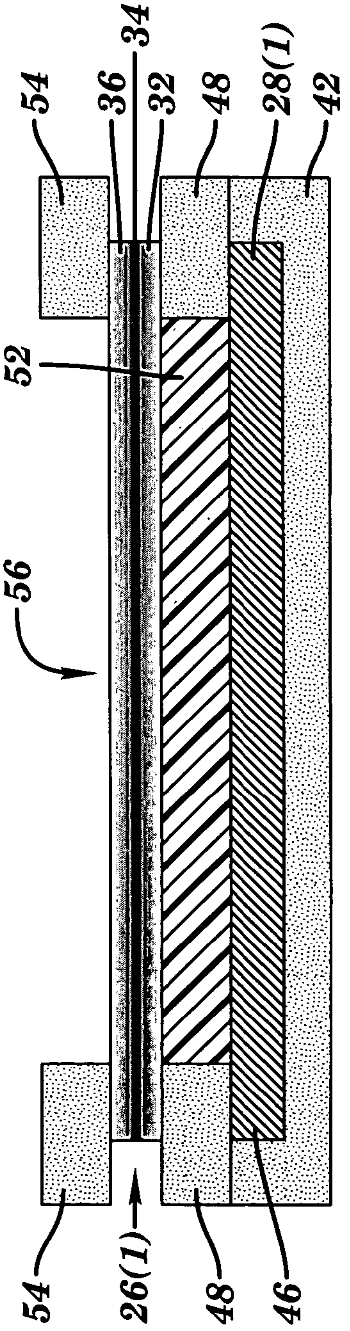

Referring to FIG. 6, a second insulating layer 54, such as silicon dioxide, is deposited on the member 26(1), although other types of materials can be used. Next, a third trench 56 is etched in the second insulating layer 54 to the member 26(1), although the third trench 56 can be etched to other depths. The third trench 56 is in substantial alignment with the second trench 50, although other arrangements can be used as long as the third trench 56 is at least in partial alignment with the second trench 50.

Figure 7:
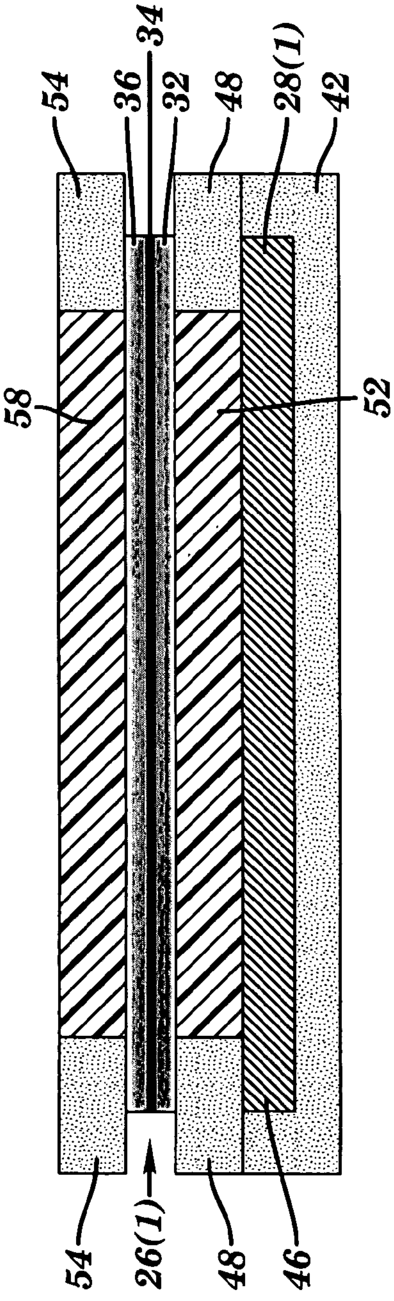

Referring to FIG. 7, the third trench 56 is filled with a second sacrificial material 58, such as polysilicon, although other types of material can be used. The second sacrificial material 58 may be planarized.

Figure 8:
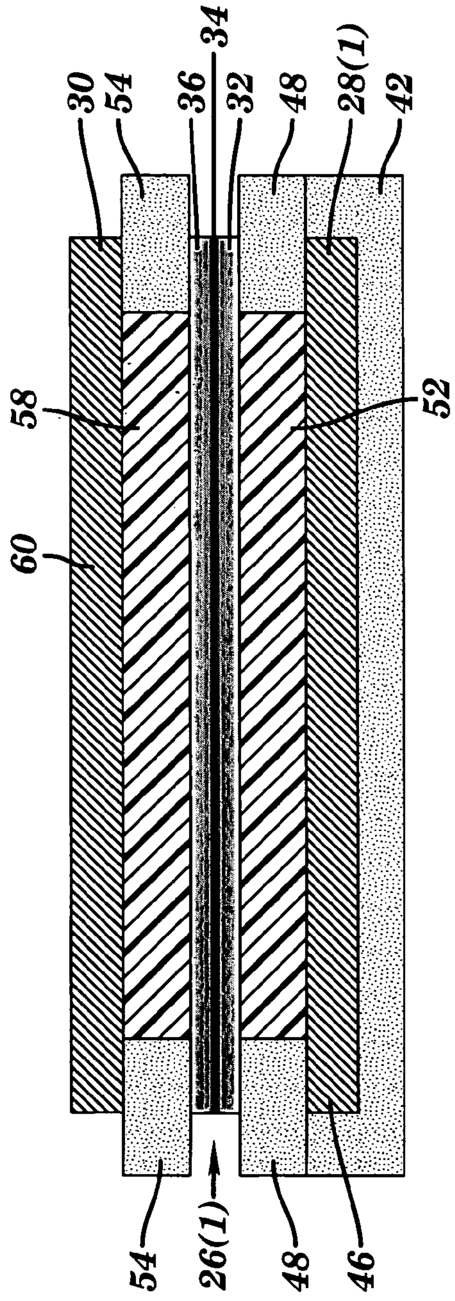

Referring to FIG. 8, a second conductive layer 60, such as aluminum, is deposited on at least a portion of the second insulating layer 54 and the second sacrificial material 58, although other types of materials can be used. The second conductive layer 60 forms the second electrode 30 in this embodiment.

Figure 9:
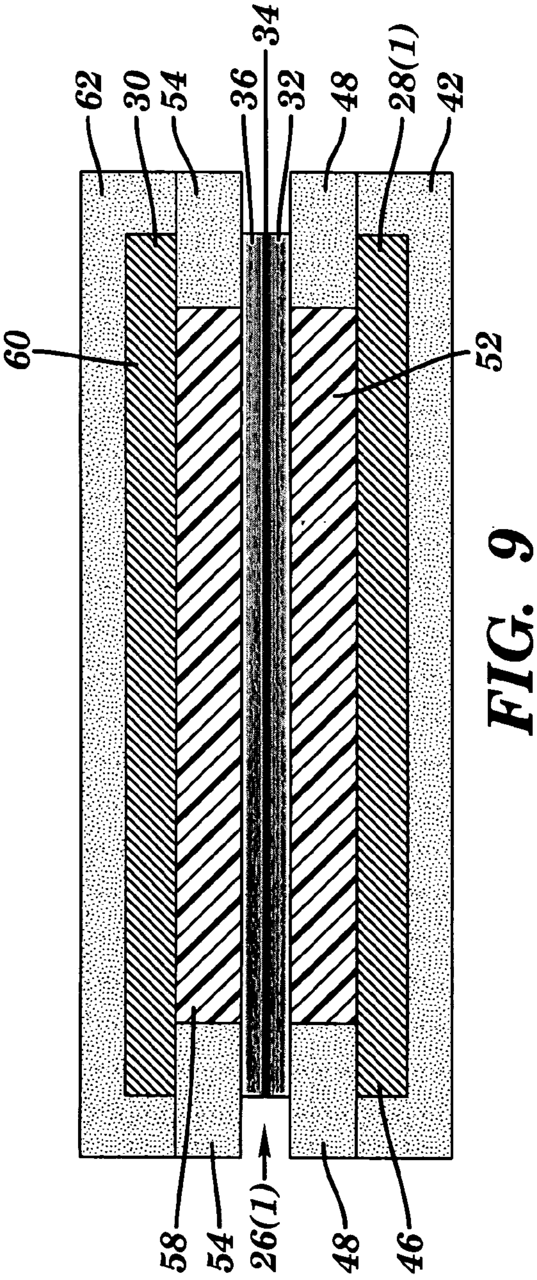

Referring to FIG. 9, a third insulating layer 62, such as silicon dioxide, is deposited over at least a portion of the second insulating layer 54 and the second electrode 30 to encapsulate the second electrode 30, although other types of materials can be used.

Next, holes or vias (not shown) are etched to the first and second electrodes 28(1) and 30 to provide contact points and are also etched to provide access to the first and second sacrificial layers 52 and 58. The first and second sacrificial materials 52 and 58 are removed through the hole(s). A variety of techniques can be used to remove the sacrificial materials 52 and 58. For example, if the sacrificial material is polysilicon, the etchant may be xenon difluoride. Removing the first sacrificial material 52 forms a first compartment and removing the second sacrificial material 58 forms a second compartment in chamber 24. The chamber 24 with first and compartment may be filled with a variety of different types of fluids and/or materials, such as air or may be in a vacuum.

Referring to FIGS. 10 and 11, the resulting power system 20(1) is shown. A load 38 is coupled to the first and second electrodes 28(1) and 30, although other types of devices could be coupled to the electrodes 28(1) and 30.

The method for making the power system 20(2) shown in FIG. 12 is the same as the method described for making the power system 20(2) as described with reference to FIGS. 1–11, except as described below. In this particular embodiment, in FIG. 3 the second trench 50 is filled with a first resilient layer 60, such as a foam, although other numbers of layers and other materials and/or fluids could be used and the second trench may also be filled with other types of devices, such as one or more mechanical springs. The first resistant layer 60 is etched to form resilient devices 62(1)–62(4), although the resilient devices can be formed in other manners, such as by inserting mechanical springs in the second trench 50. The trenches or openings between the resilient devices 62(1)–62(4) is filled with the first sacrificial material 52 and may be planarized, although other types of materials could be used. By way of example, the planarizing of the first sacrificial layer 52 may be done by standard CMP processing, although other techniques can be used.

Additionally in the embodiment shown in FIG. 12, a member 26(2) which can store a fixed electronic charge is deposited on a portion of the first insulating layer 48 and the first sacrificial material 52. In this particular embodiment, the member 26(2) comprises a single layer 37 that can store fixed charge, although member 26(2) may comprise other numbers of layers of material. In this particular embodiment, the member 26(2) is fixed with respect to one of the electrodes 30.

Further, in this particular embodiment, the substrate 42 is removed from the first electrode 28(2). The first electrode 28(2) can move to member 26(2) and the other electrode 30.

The method for making the power system 20(3) shown in FIG. 13 is the same as the method described for making the power system 20(1) as described with reference to FIGS. 1–11, except as described below. In this particular embodiment, supports 39(1) and 39(2) are placed between member 26(1) and substrate 42, resilient devices 40(5)–40(7) are placed between electrode 28(1) and substrate 30, and resilient devices 40(8) and 40(9) are placed between electrode 30 and member 26(1), although other configurations, materials, and devices can be used.

The method for making the power system 20(4) shown in FIG. 14 is the same as the method described for making the power system 20(1) as described with reference to FIGS. 1–11, except as described below. In this particular embodiment, an insulating material 51 is placed between electrode 30 and member 26(1) in chamber 24 and resilient devices 40(10) and 40(11) are placed between and connect electrode 30 and substrate 42, although other configurations, materials, and devices can be used.

The method for making the power system 20(5) shown in FIG. 15 is the same as the method described for making the power system 20(1) as described with reference to FIGS. 1–11, except as described below. In this particular embodiment, an insulating material 51 is placed between and connects electrode 30 and member 26(1) and electrode 28(1) is pivotally connected at one end to the housing 22, although other configurations, materials, and devices can be used.

A method for making a power system 20(6) in accordance with another embodiment of the present invention is described below with reference to FIGS. 16–19(D). To make a power system 20(6) the propeller 60 is seated on one portion of the rotatable shaft 62 and the member 26(3) is seated on another portion of the shaft 62 so that when the propeller 60 rotates, the shaft 62 is rotated which rotates the member 26(3), although power system 20(6) can be made in other manners with other components, such as with other types of devices for transferring motion to the member 26(3) and/or the electrodes 64(1) and 64(2) and with or without the shaft 62.

The electrodes 64(1)–64(2) are positioned on opposing sides of member 26(3) so that the electrodes 64(1)–64(2) are substantially in alignment and are spaced substantially the same distance from the member 26(3), although other configurations can be used. By way of example only, the distance between each of the pair of electrodes 64(1)–64(2) and the member 26(3) is about 1.0 mm, although this distance can vary.

The load 38 is coupled to the pair of electrodes 64(1) and 64(2), although other types of devices can be coupled to the electrodes 64(1) and 64(2), such as a device which uses and/or stores the generated power.

Figure 19A:
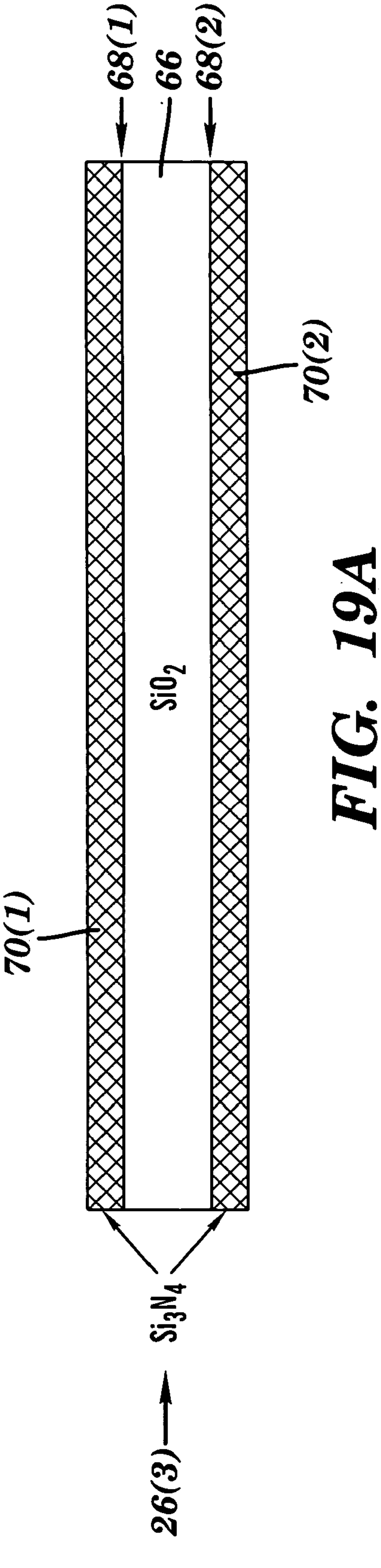
FIGS. 19A–19D are side, cross-sectional view of a method for making a power system in accordance with another embodiment of the present invention.

The method for making the member 26(3) is illustrated with reference to FIGS. 19(A)–19(D). Referring to FIG. 19A, second insulating layers 70(1) and 70(2), such as $Si_3Ni_4$, are deposited on a first insulating layer or substrate 66, such as $SiO_2$. A variety of different types of techniques for depositing the second insulating layers 70(1) and 70(2) on to the first insulating layer 66 can be used, such as chemical vapor deposition or sputtering, although other techniques could be used.

Figure 19B:
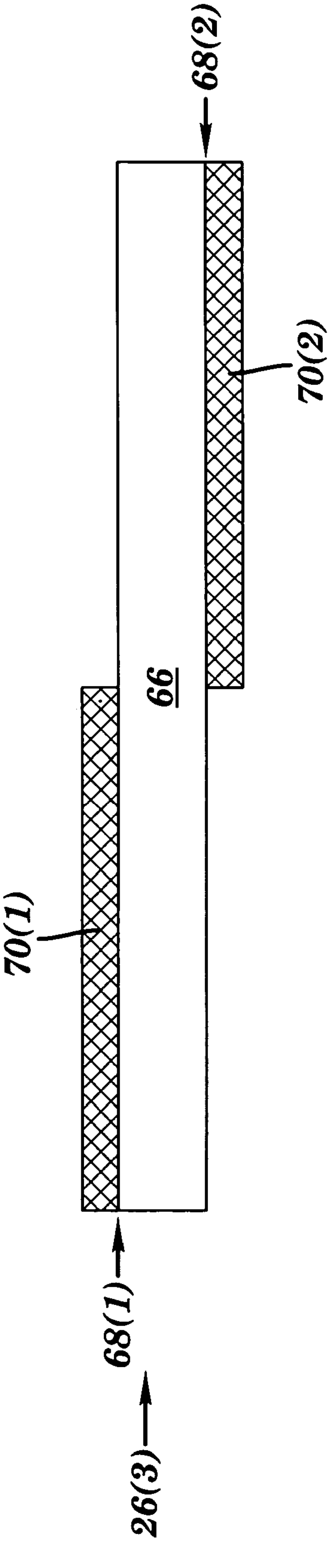

Referring to FIG. 19B, a portion of the second insulating layer 70(1) is removed from first insulating layer 66 by masking and etching the portion of second insulating layer 70(1) away, although other techniques for removing the portion of second insulting layer 70(1) or otherwise forming the remaining portion of second insulating layer 70(1) could be used. Another portion of second insulating layer 70(2) which is spaced from the remaining portion of the first insulating layer 70(1) on the opposing surface of first insulating layer 66 is removed by masking and etching from first insulating layer 66, although other techniques for removing the portion of second insulting layer 70(2) or otherwise forming the remaining portion of second insulating layer 70(2) could also be used.

Figure 19C:
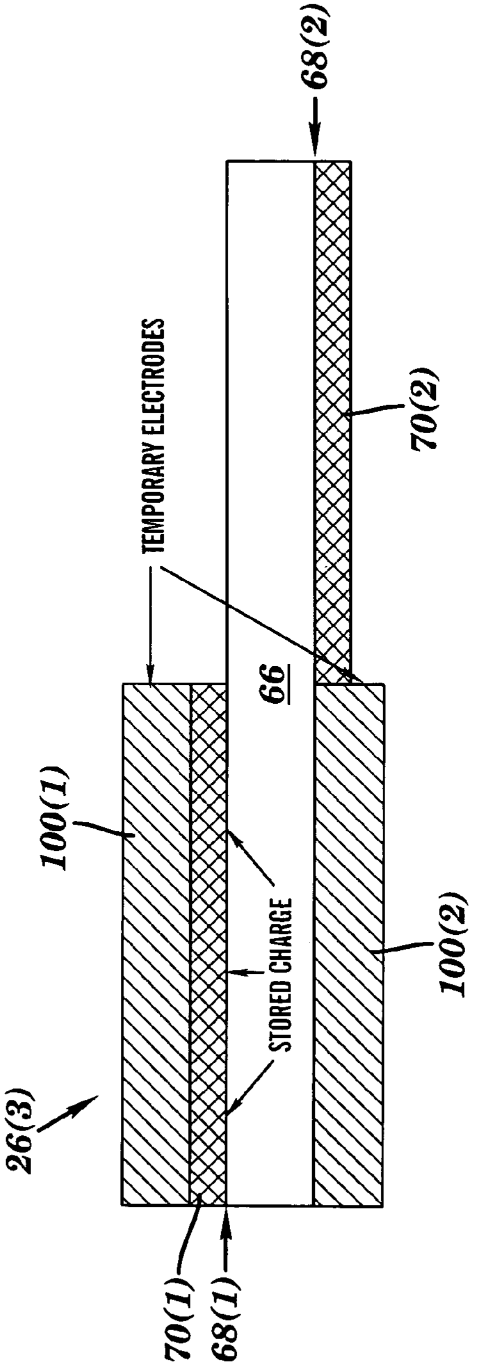
Figure 19D:
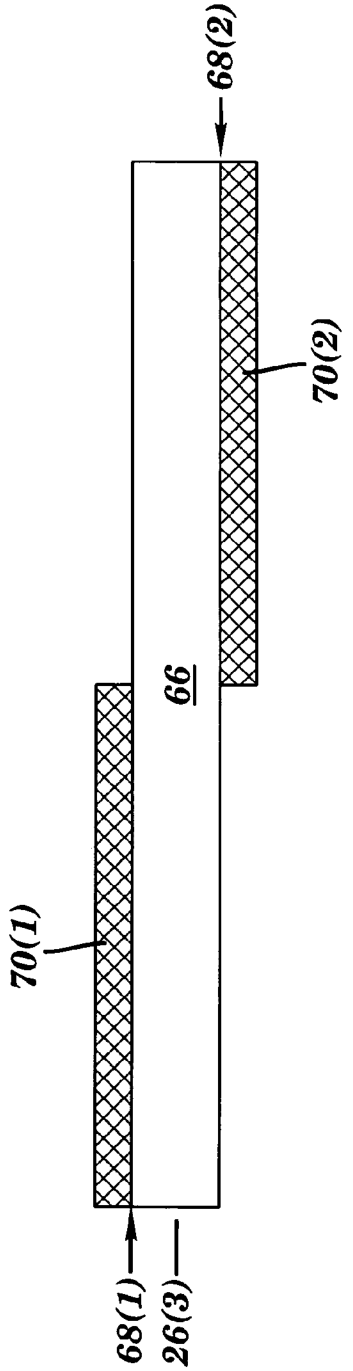

Referring to FIG. 19C, temporary electrodes 100(1) and 100(2) are placed on opposing sides of member 26(3) on second insulating layer 70(1) and first insulating layer 66, respectively, and in substantial alignment with the interface 68(1) where the charge will be stored. A high voltage is applied across the electrodes 100(1) and 100(2) which causes electrons to tunnel into the conduction band of the first insulating layer 66 and will eventually be trapped at the interface 68(1). Although a high field injection is shown for trapping charge at the interface 68(1), other techniques for storing charge at the interface 68(1) can be used, such as ballistic injection. Although not shown, charge is also stored in interface 68(2) in the same manner using temporary electrodes 100(1) and 100(2) on first and second insulating layers 66 and 70(2), respectively, although other techniques for storing charge at the interface 68(2) could be used. Once the charge is trapped at the interfaces 68(1) and 68(2), the temporary electrodes 100(1) and 100(2) are removed and the resulting member 26(3) is illustrated in FIG. 19(D). The member 26(3) forms a structure with a monopole charge with the charges, in this example electrons, trapped at the interfaces 68(1) and 68(2).

The operation of the power system 20(1) in accordance with one embodiment will be described with reference to FIGS. 10 and 11. In this particular embodiment, the member 26(1) has a natural resonant frequency. Any vibrational or shock input, such as from the local environment, will cause the member 26(1) to oscillate. When the member 26(1) is nearest to the first electrode 28(1), the portion of induced opposite sign charge on the first electrode 28(1) will be greater than on the second electrode 30. When the member 26(1) is nearest the second electrode 30, the induced opposite sign charge on the second electrode 30 will be greater than on the first electrode 28(1). When the first and second electrodes 28(1) and 30 are connected to a load 38, useful energy can be extracted as the charge-storing member oscillates. By way of example only, if the power system 20(1) was in a shoe, then as the wearer of the shoe walked or moved the vibrations would be converted to useful energy that could be output to power a load 38.

The output from the first and second electrodes 28(1) and 30 may be post processed if desired. For example, if the time varying potential is to be used to charge a capacitor, a rectifying system together with a diode may be chosen that will break down above the output potential difference level, thus allowing charging of the capacitor, but not discharging back through the system. In another application, a voltage regulator may be used to process the time varying potential difference. In still another application, a full wave rectifier may be used to convert the time varying potential difference to direct current. Also, other components, such as capacitors, may be used to smooth DC voltage ripples in the generated power.

The operation of the power system 20(2) is the same as that for the power system 20(1), except as described herein. The member 26(2) is fixed with respect to the electrode 30 and the electrode 28(2) can be moved toward and away from member 26(2), although other configurations are possible. Any vibrational input, such as from the local environment, will cause the member electrode 28(2) to oscillate or move. The resilient devices are used to control the oscillation of the electrode 28(2) and when the vibrational input stops, eventually returns the electrode 28(2) to its initial state. When the member 26(2) is nearest to the first electrode 28(2), the portion of induced opposite sign charge on the first electrode 28(2) will be greater than on the second electrode 30. When the member 26(2) is nearest the second electrode 30, the induced opposite sign charge on the second electrode 30 will be greater than on the first electrode 28(2). When the first and second electrodes 28(2) and 30 are connected to a load

38, useful energy can be extracted as the electrode 28(2) moves with respect to member 26(2).

The operation of the power system 20(3) shown in FIG. 13 is the same as that for the power system 20(1), except as described herein. With the resilient devices 40(5)–40(9), the member 26(1) and the substrate 42 are movable with respect to the electrodes 28(1) and 30, although other ways of moving member 26(1) and electrodes 28(1) and 30 with respect to each other can be used. Any vibrational input will cause member 26(1) and substrate 42 to oscillate or move which generates a potential difference on electrodes 28(1) and 30 that can be extracted as useful energy as described in greater detail above with reference to power systems 20(1) and 20(2).

The operation of the power system 20(4) shown in FIG. 14 is the same as that for the power system 20(1), except as described herein. With the resilient devices 40(10)–40(11), the electrode 28(1) is movable with respect to the member 26(1) and substrate 42, although other ways of moving member 26(1) and electrodes 28(1) and 30 with respect to each other can be used. Any vibrational input will cause electrode 28(1) to oscillate or move which generates a potential difference on electrodes 28(1) and 30 that can be extracted as useful energy as described in greater detail above with reference to power systems 20(1) and 20(2).

The operation of the power system 20(5) shown in FIG. 15 is the same as that for the power system 20(1), except as described herein. Any vibrational input will cause electrode 28(1) to oscillate or move which generates a potential difference on electrodes 28(1) and 30 which can be extracted as useful energy as described in greater detail above with reference to power systems 20(1) and 20(2).

The operation of the power system 20(6) in accordance with another embodiment will be described with reference to FIGS. 16–18(B). When a fluid, such as air or water, strikes the propeller 60, the propeller 60 rotates which rotates the shaft 62 in a clockwise direction, although the propeller 60 and shaft 62 can be rotated in the opposing direction. Rotating the shaft 62 rotates the member 26(3) in a clockwise direction so that the sections 69(1)–69(4) are sequentially rotated between the electrodes 64(1)–64(2), although the member 26(3) can be rotated in the opposing direction and through other numbers of pairs of electrodes and the member 26(3) can be rotated or moved in other manners, such as by manual motion with a hand crank, and without the shaft.

As the sections 69(1)–69(4) pass between the electrodes 64(1)–64(2) or vice versa, the interfaces 68(1) or 68(2) in sections 69(1)–69(4) where the stored fixed static charge resides are closer to either electrode 64(1) or to electrode 64(2) which induces a change in potential between the pair of electrodes 64(1)–64(2). More specifically, when sections 69(1) and 69(3) are between the electrodes 64(1)–64(2), then the interface 68(1) in the sections 69(1) and 69(3) where the stored fixed static charge resides is closer to the electrode 64(1). When sections 69(2) and 69(4) are between the electrodes 64(1)–64(2), then the interface 68(2) in the sections 69(2) and 69(4) where the stored fixed static charge resides is closer to the electrode 64(2). Although four sections 69(1)–69(4) are shown, the power system 20(6) can have more or fewer sections. The induced potential between electrodes 64(1)–64(2) can be output to a device, such as a load 38 or a power storage device.

Accordingly, the present invention is directed to a renewing power source or supply, energy harvester, or energy generator. The present invention uses embedded static charge in a member in a resonating or otherwise moving structure to provide a power source for devices. Energy is effectively extracted from the local environment from a displacement current caused by the embedded charge member's and/or one or more of the electrodes movement due to movement of the embedded charge member, such as natural vibrations or shocks from the local surroundings, manual movement, e.g. with a hand crank, or wind, water, or other fluid movement.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A power system comprising:

a non-conducting member with a stored static charge which is a monopole charge to form a monopole structure, the non-conducting member comprises two or more sections; and at least two or more electrodes, wherein each of the two or more electrodes is spaced from and on substantially opposing sides of the member from the other electrode and is at least partially in alignment with the other electrode;

wherein at least one of the member and the at least two or more electrodes is moveable with respect to the other; and wherein when at least one of the sections is at least partially between the two or more electrodes, the at least one of the sections has the stored static electric charge closer to one of the two or more electrodes and when at least one of the other sections is at least partially between the two or more electrodes, the at least one of the other sections has the stored static electric charge closer to the other one of the two or more electrodes.

2. The system as set forth in claim 1 further comprising an energy conversion device coupled to the member, where movement of the energy conversion device rotates the member.

3. The system as set forth in claim 2 further comprising a shaft connected between the energy conversion device and the member, wherein movement of the energy conversion device rotates the shaft and the member.

4. The system as set forth in claim 2 wherein the energy conversion device comprises a propeller.

5. The system as set forth in claim 1 wherein each of the sections has two or more layers of dissimilar insulators, wherein the stored static electrical charge is substantially at an interface between the layers.

6. The system as set forth in claim 5 wherein each of the layers of the member is made from one or more materials selected from a group consisting of silicon oxide, silicon dioxide, silicon nitride, aluminum oxide, tantalum oxide, tantalum pentoxide, titanium oxide, titanium dioxide, barium strontium titanium oxide, calcium fluoride, and magnesium fluoride.

7. The system as set forth in claim 1 wherein the monopole charge comprises electrons.

8. The system as set forth in claim 1 wherein the member comprises four sections.

9. The system as set forth in claim 1 further comprising a load coupled to the two or more electrodes.

10. A method of making a power system, the method comprising:

providing a non-conducting member with a stored static charge which is a monopole charge to form a monopole structure, the non-conducting member comprises two or more sections; and providing at least one two or more electrodes, wherein each of the two or more electrodes is spaced from and on substantially opposing sides of the member from the other electrode and is at least partially in alignment with the other electrode;

wherein at least one of the member and the at least two or more electrodes is moveable with respect to the other; and wherein when at least one of the sections is at least partially between the two or more electrodes, the at least one of the sections has the stored static electric charge closer to one of the two or more electrodes and when at least one of the other sections is at least partially between the two or more electrodes, the at least one of the other sections has the stored static electric charge closer to the other one of the two or more electrodes.

11. The method as set forth in claim 10 further comprising coupling a energy conversion device to the member, wherein movement of the energy conversion device rotates the member.

12. The method as set forth in claim 11 further comprising connecting the member and the energy conversion device to a portion of a rotatable shaft, wherein movement of the energy conversion device rotates the shaft and the member.

13. The method as set forth in claim 11 wherein the energy conversion device comprises a propeller.

14. The method as set forth in claim 10 wherein each of the sections has two or more layers of dissimilar insulators, wherein the stored static electrical charge is substantially at an interface between the layers.

15. The method as set forth in claim 14 wherein each of the layers of the member is made from one or more materials selected from a group consisting of silicon oxide, silicon dioxide, silicon nitride, aluminum oxide, tantalum oxide, tantalum pentoxide, titanium oxide, titanium dioxide, barium strontium titanium oxide, calcium fluoride, and magnesium fluoride.

16. The method as set forth in claim 10 wherein the monopole charge comprises electrons.

17. The method as set forth in claim 10 wherein the member comprises four sections.

18. The method as set forth in claim 10 further comprising coupling a load to the two or more electrodes.

19. A method for generating power, the method comprising:

moving at least one of a non-conducting member and at least two or more electrodes with respect to the other, wherein the member has a stored static electrical charge which is a monopole charge to form a monopole structure and comprises two or more sections, wherein when at least one of the sections is at least partially between the two or more electrodes, the at least one of the sections has the stored static electric charge closer to one of the two or more electrodes and when at least one of the other sections is at least partially between the two or more electrodes, the at least one of the other sections has the stored static electric charge closer to the other one of the two or more electrodes;

inducing a potential on the pair electrodes as a result of the moving; and outputting the induced potential.

20. The method as set forth in claim 19 further comprising storing the outputted induced potential.

21. The method as set forth in claim 19 wherein each of the sections with the stored static charge is a structure with a monopole charge.

22. The method as set forth in claim 21 wherein the monopole charge comprises electrons.

* * * * *